United States Patent [19]
Franklin et al.

[11] Patent Number: 5,447,464
[45] Date of Patent: Sep. 5, 1995

[54] AUTOMATED METHOD OF FINISHING THE TIP OF A TERMINATED OPTICAL FIBER

[75] Inventors: Vinod J. Franklin, Hershey; James D. Kevern, Wellsville, both of Pa.

[73] Assignee: The Whitaker Corporation, Wilmington, Del.

[21] Appl. No.: 103,501

[22] Filed: Aug. 6, 1993

[51] Int. Cl.6 .................................................. B24B 1/00
[52] U.S. Cl. ............................................ 451/28; 451/57
[58] Field of Search ............ 51/281 R, 283 R, 284 R, 51/289 R, 326, 328, 135 R, 137, 62, 216 LP, 217 R, 217 S, 217 L, 58, 67, 34 E; 451/28, 41, 42, 49, 57, 59, 296, 299, 390, 365, 366, 384, 163, 173, 152, 168

[56] References Cited
U.S. PATENT DOCUMENTS

| | | | |
|---|---|---|---|
| 4,272,926 | 6/1981 | Tamulevich | 51/216 R |
| 4,384,431 | 5/1983 | Jackson | 51/34 E |
| 4,492,060 | 1/1985 | Clark | 51/326 |
| 4,498,260 | 2/1985 | Doty | 51/217 R |
| 4,539,776 | 9/1985 | Weaver, Jr. | 51/156 |
| 4,649,670 | 3/1987 | Snyder | 51/284 R |
| 4,693,035 | 9/1987 | Doyle | 51/125 |
| 4,711,053 | 12/1987 | Snyder | 51/3 |
| 4,766,705 | 8/1988 | Dholakia | 51/328 |
| 4,967,518 | 11/1990 | Moulin | 51/326 |
| 5,184,433 | 2/1993 | Maack | 51/283 R |
| 5,335,453 | 8/1994 | Baldy et al. | 51/67 |

OTHER PUBLICATIONS

"An Automated Method of Finishing the Tip of a Terminated Optical Fiber"; Filed Aug. 6, 1993; Inventors, Vinod J. Franklin et al.; U.S. Patent Office S/N 08/103,501. *(Abstract and Drawings.).

*Primary Examiner*—Bruce M. Kisliuk
*Assistant Examiner*—Derris H. Banks
*Attorney, Agent, or Firm*—Driscoll A. Nina, Jr.; June B. Schuette

[57] ABSTRACT

An automated method is disclosed for grinding and polishing the terminated ends of the optical fibers in a fiber optic cable. The abrasive material, in strip form, is moved in a carriage along a linear path while the carriage is oscillated in a circle within a plane during polishing. There are three separate work stations operating concurrently, the first having a relatively course grade of abrasive while the others have finer grades. Fixtures holding the cables for polishing are held in fixture supports that are automatically fed toward the abrasive material during polishing and retracted after polishing is complete. The fixture engagement mechanism for the first carriage engages at a slower rate than do the mechanisms of the other carriages.

3 Claims, 3 Drawing Sheets

AUTOMATED METHOD OF FINISHING THE TIP OF A TERMINATED OPTICAL FIBER

FIELD OF THE INVENTION

The present invention is related to a method for automatically grinding and finish polishing the tip of a terminated optical fiber.

BACKGROUND OF THE INVENTION

Polishing machines for grinding and polishing the ends of fiber optic cables are usually of the type having a rotating abrasive disk that is maintained relatively flat. The optical fiber is secured in a fixture having a flat bottom. The end of the optical fiber that is to be polished projects slightly below this bottom surface, sometimes under the urging of a spring mechanism to control the forces on the fragile optical fiber. The fixture, with its fiber optic cable attached, is carefully lowered onto the rotating abrasive disk and made to undergo a standard polishing pattern such as circular or figure eight. The polishing usually occurs in a particular segment of the rotating disk so that, as polishing continues, the same abrasive surface is continually presented to the tips being polished. There are usually three or more stages of polishing that must be done in sequence, from relatively course abrasive to very fine. Prior to machine polishing, however, it is usually necessary to hand polish the tips to remove the protruding fiber stubs to prevent damage. In certain prior art polishing machines, during the final stage the bottom surface of the fixture contacts the abrasive disk so that the end of the optical fiber is polished to a flat surface flush with the bottom surface of the fixture. Other prior art polishing machines rely upon the tips of the optical fibers themselves in contact with the abrasive surface to maintain the axes of the fixture and the cables somewhat perpendicular to the surface of the abrasive material. In these machines the fixture itself does not contact the abrasive material, therefore, the quality of the final polished surfaces of the cable is dependant upon the amount of ferrule projection below the bottom of the fixture. Such projections will vary due to variations in the manufacturing of the terminated cables. That is, when the cables are loaded into the fixture they are positioned with respect to some feature of the connector such as a shoulder. This results in the tips of the optical fibers extending below the bottom surface of the fixture by varying amounts, the three tips that extend the farthest being the ones that establish the initial angle between the axes and the abrasive surface. With such an arrangement some of the optical fibers are polished more than others resulting in inconsistency and varying quality.

What is needed is a polishing machine and method of operation that controls the relative motion of the tips of the optical fibers with respect to the abrasive material so that fresh abrasive is always presented to the tips for efficient and high quality polishing. To eliminate the need for preparatory hand polishing, the machine should allow for relatively slow engagement during the initial stage of polishing with a more normal rapid engagement during later stages. Additionally, the tips of the optical fibers should be located in a plane that is parallel with the abrasive surface prior to polishing and the fixture that holds the fiber optic cables should be maintained in this plane during polishing, thereby obviating the alignment and quality problems mentioned above or the need for the fixture to contact the abrasive material to maintain vertical alignment.

SUMMARY OF THE INVENTION

An automated method is disclosed for grinding and polishing the tips of terminated optical fibers of an optical cable by means of an automated machine. The machine includes a frame, carrier means attached to the frame, and first abrasive material having a flat surface defining a plane and a work area within the plane where the tips of the optical fibers engage the abrasive material. The abrasive material is held in the carrier means and moved along a first path and a second path within the plane. A fixture is provided for holding the fiber optic cables including means for securing the fixture in the frame. The method includes the steps of: Loading the optical cable into the fixture and securing the fixture in a first station of the machine so that the ends of the ferrules are in a first plane substantially parallel with the plane of the first abrasive material. Moving the first abrasive material along a first path within the work area and concurrently therewith moving the first abrasive material in an oscillating motion along a second path within the work area different from the first path. Causing the fixture to move at a first predetermined rate toward the first abrasive material and into an engaged position wherein the tips of the optical fibers abrasively engage the flat surface thereof in the work area while maintaining the first plane parallel with the plane of the first abrasive material. Then causing the fixture to remain in the engaged position for a predetermined period of time.

DESCRIPTION OF THE PREFERRED EMBODIMENT

Figure 1:
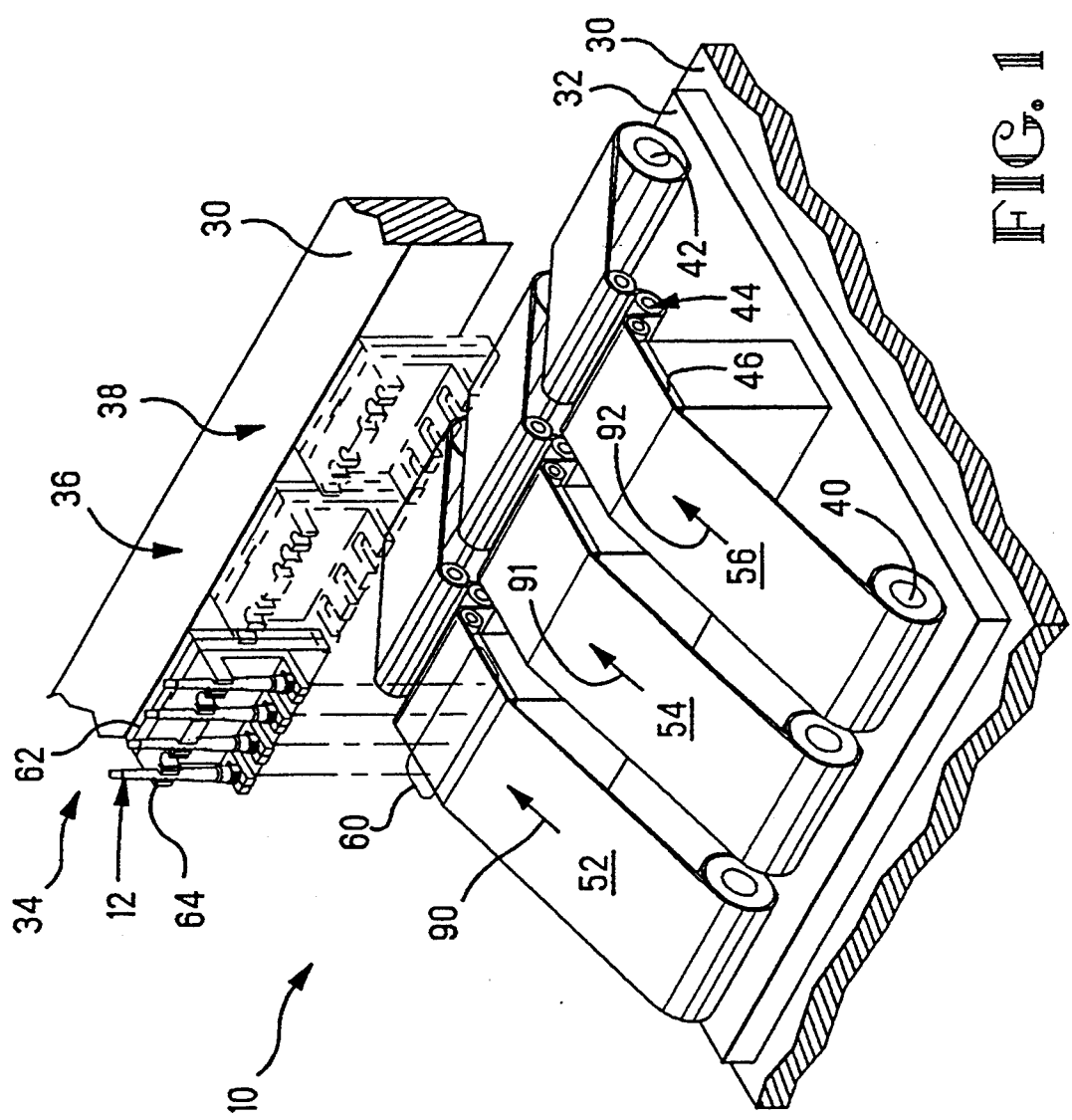
FIG. 1 is a schematic representation of a machine having the functional elements for practicing the teachings of the present invention.
Figure 2:
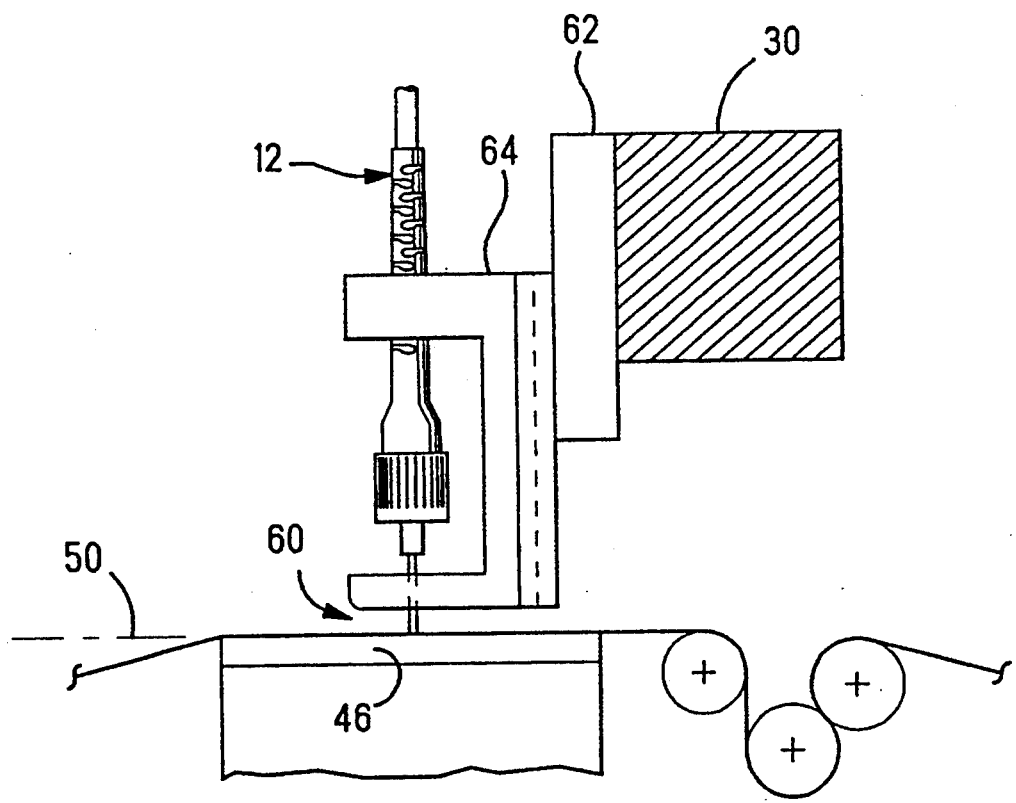
FIG. 2 is a partial end view of the machine shown in FIG. 1.

The major functional elements of an optical fiber grinding and polishing machine 10, as used in accordance with the teachings of the present invention, are shown in FIGS. 1, 2, 3, and 4. An example of a typical terminated fiber optic cable 12 is shown in FIG. 5. There, a fiber optic cable 14 is shown, a strain relief 16, and a connector 18 attached to the end of the cable. The connector 18 includes a ceramic ferrule 20 extending axially from the end of the connector. The ferrule includes a central bore containing the optical fiber 22 that is held in place by means of adhesive or mechanical means such as crimping. The optical fiber 22 is shown extending from the tip of the ferrule by an exaggerated amount for illustrative purposes, although, the actual amount of extension is quite small and may vary from cable to cable. As shown in FIG. 1, the machine 10 includes a frame 30 and a carriage 32 arranged within the frame to undergo oscillating movement. There are first, second, and third work stations 34, 36, and 38 in the machine, each of which includes similar structural elements such as a supply spindle 40 of abrasive material, a takeup spindle 42, a pair of pinch rollers 44 for pulling the strip of abrasive material from the supply spindle, and a platen 46 having a flat surface. Due to drag at the supply spindle the strip of abrasive material is pulled tight over the flat surface of the platen 46 by the pinch rollers 44 thereby defining a plane 50, as best seen in FIG. 2. The flat area of the abrasive material in contact with each of the platens 46 and in the plane 50 defines a work area 60 where the tips of the optical fibers engage the abrasive material for grinding and polishing. The first station 34 includes a first strip of abrasive material 52 having a relatively course grit for initial grinding of the optical fibers. The second and third stations have second and third strips of abrasive material 54 and 56 respectively that are of finer grit, the third strip being the finest grit. The oscillating motion of the carriage 32 is arranged so that the flat surface of the platen 44 remains entirely within the plane 50. In the present example, the oscillating motion is circular and my be effected by any of a number of well known mechanisms such as an eccentric or a scotch yolk. However, other oscillating motions may be utilized in the practice of the present invention such as other arcuate motions or linear motions that are normal to the direction of feed of the abrasive material or at an angle other than 90 degrees thereto.

Figure 3:
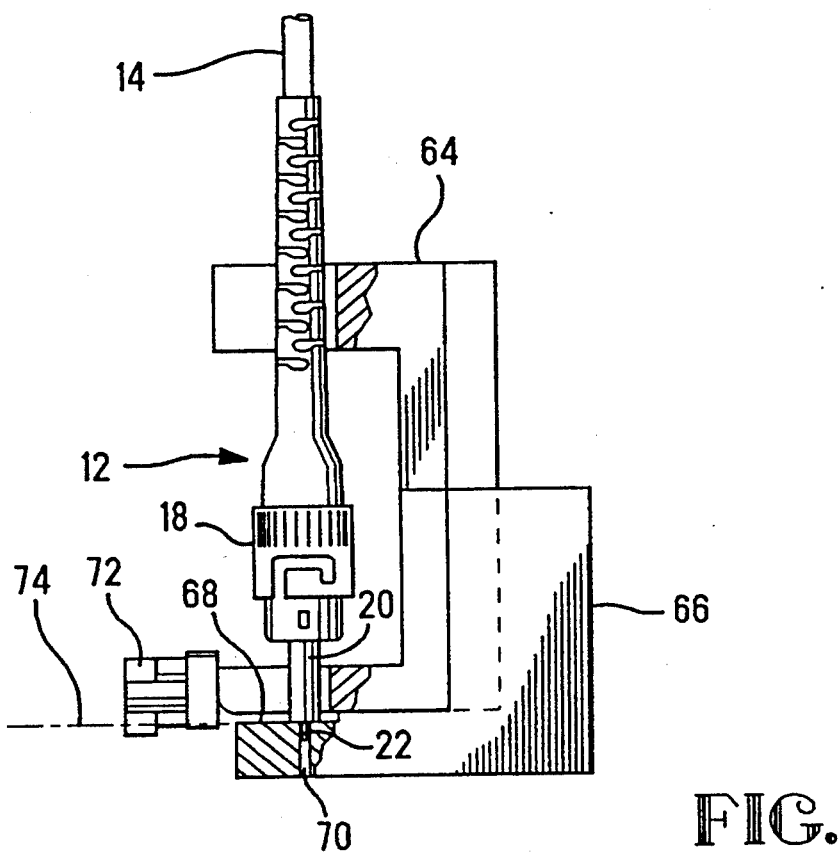
FIG. 3 is an end view of a cable holding fixture and loading fixture as used in the practice of the present invention.

Each of the first, second, and third workstations includes a vertical slide mechanism 62 attached to the frame 30 having a movable portion that is arranged to move toward and away from the abrasive material in the work area 60. A lead screw and gear arrangement attached to the frame 30 and a nut attached to the movable portion of the slide 62 in threaded engagement with the lead screw, effects the vertical movement toward and away from the abrasive material. While the lead screw, nut, and gear arrangement is not shown, such structures are well known in the art. A fixture 64 is removably secured to the movable portion of the slide and positions and holds the optical cables 12 for grinding and polishing. As shown in FIG. 3, the optical cables 12 are loaded into the fixture 64 with the aid of a loading fixture 66 having a flat banking surface 68 against which the tips of the ferrules 20 are located. There is a clearance opening 70 in the loading fixture 66 for the optical fibers that extend beyond the tips of the ferrules so that the tips of the ferrules will engage the banking surface 68. With the tips of the ferrules 20 all in alignment against the banking surface 68 the clamps 72 are tightened to secure the cables 12 in the fixture 64. The tips of the ferrules 20 thereby define a first plane 74. When the fixture 64 is secured to the movable portion of the slide 62, in any station, it is arranged so that the first plane is parallel with the flat surface of the platen 46. This assures that the tips of the optical fibers will be ground and polished uniformly.

Figure 4:
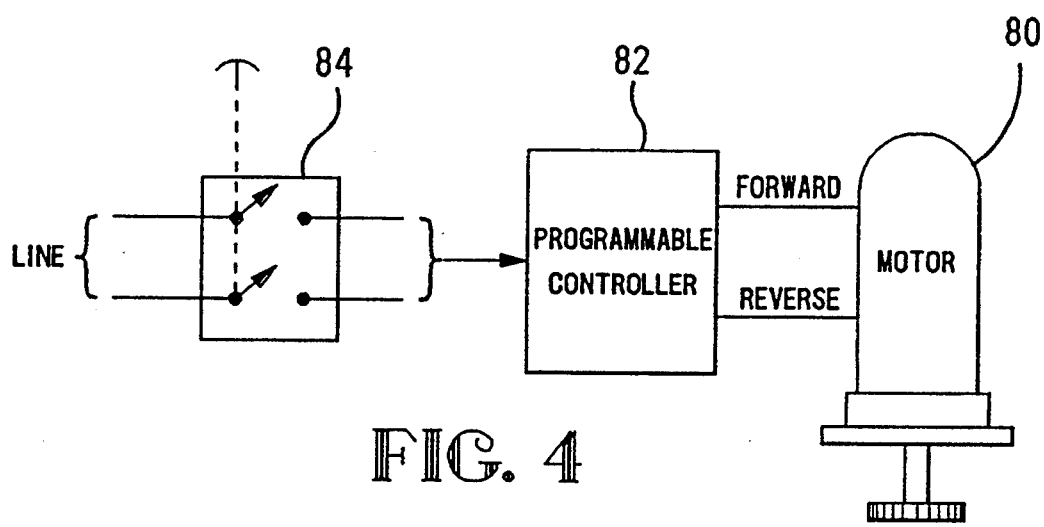
FIG. 4 is a schematic diagram showing the control function for the machine of FIG. 1.
Figure 5:
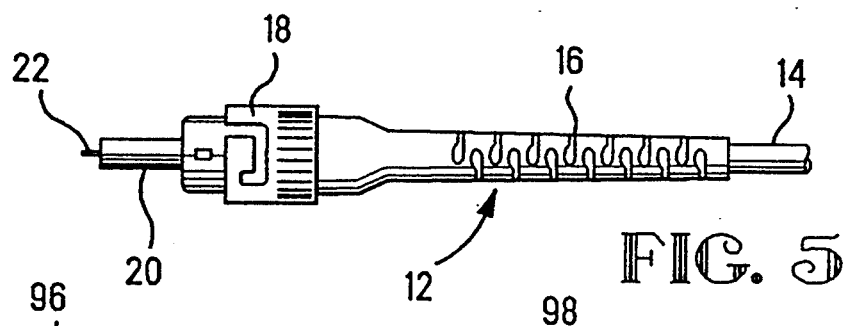
FIG. 5 is a plan view of a terminated fiber optic cable of the type that is finished in the machine of FIG. 1.

The movements of the pinch rollers 44, the oscillating movement of the carriage, and the movement of the fixture 64 toward and away from the abrasive material are provided by an electric motor 80 shown in FIG. 4. The drive mechanism interconnecting the motor with the moving elements of the machine is not shown, however, such mechanisms are well known and any suitable mechanism that produces the desired motions may be utilized, including additional motors 80. The motor 80 is controlled by a programmable controller 82, which in tern, is activated by a manually operated switch 84.

In operation the fixture 64 is placed in the loading fixture 66 and the optical cables 12 are placed in position with the tips of their ferrules in contact with the banking surface 68, as shown in FIG. 3. The clamps 72 are then actuated locking the cables 12 in place so that tips of their ferrules form a first plane. The fixture is then secured in the first workstation 34 of the machine 10 with the first plane parallel with the plane 50 of the platen, as shown in FIG. 1. The switch 84 is then actuated causing the programmable controller 82 to provide power to the forward windings of the motor 80 for a specific duration of time, in the present example about 50 seconds. The time duration is programmable and is chosen to correspond to the grit size and feed rate utilized. During this time the pinch rollers 44 are operated to move the strip 52 of abrasive material forward along a first path as shown by the arrow 90 in FIG. 1. Note that the strip 52 moving along the first path moves from the supply spindle 40, over the platen 46 through the work area 60, through the pinch rollers 44, to the takeup spindle 42. This assures that fresh abrasive material is presented to the tips during grinding and polishing, and that any abrasive material that is damaged or contaminated by the pinch rollers 44 does not adversely affect the operation. Concurrently, the carriage 32 is caused to oscillate thereby moving the portion of the strip 52 in contact with the platen 46 in a second path that is entirely within the plane 50. As mentioned above, the oscillation of the carriage 32 may be circular, arcuate, or linear, where linear motion may be at any desired angle to the direction of movement of the strip 52 along the first path. The particular form of oscillation selected is optional and intended to achieve a desired effect, as will be described further below. During the 50 second time duration, the lead screw of the slide 62 is rotated to cause the fixture 64 to move toward the strip 52 of abrasive material at a fixed rate that is predetermined by a geared arrangement. This first predetermined rate is chosen to be less than the normal rate of removal of material from the optical fibers by the abrasive material under the present conditions. This assures that undue stress will not be applied to the individual optical fibers 22 extending below the tips of the ferrules 20, some of which may have burrs or sharp edges that may tend to dig into the abrasive material. Such undue stress may damage the optical fiber or render the quality of the finished surfaces inconsistent from one cable to the next. For this reason, most prior art methods of finishing the ends of terminated optical fibers include a manual step of lightly grinding the tips by hand prior to machine grinding and polishing. Once the lead screw has been rotated to its stop position and the fixture is in its fully engaged position, as shown in FIG. 2, a slip clutch allows the motor 80 to continue driving the other motion functions of the machine 10 while the fixture remains stationary for the remainder of the 50 seconds. At the end of the 50 second time period the programmable controller 82 removes power from the forward windings of the motor 80 and applies power to the reverse windings. One way clutches in the machine 10 disengage the oscillating motion of the carriage and the forward feed of the strip 52 along the first path while permitting the lead screw of the slide 62 to reverse direction and thereby withdraw the fixture 64 away from the strip of abrasive material. When the fixture 64 is fully withdrawn the programmable controller 82 removes all power from the motor 80 and reinitializes itself to be ready for another cycle of operation when the switch 84 is again actuated.

The fixture 64 is then removed from the first workstation and secured in the second workstation 36 with the first plane parallel with the plane 50 of the strip of abrasive material 54. It will be understood by those skilled in the art that the planes 50 of each of the workstations 34, 36, and 38 my be coplanar, as in the present example, however, they need not be. The switch 84 is again actuated causing the programmable controller 82 to provide power to the forward windings of the motor 80 for another 50 second time period. During this time the pinch rollers 44 are operated to move the strip 54 of abrasive material forward along a third path as shown by the arrow 92 in FIG. 1. Note that the strip 54 moves along the third path in a manner similar to the movement of the strip 52 along the first path. Concurrently, the carriage 32 is caused to oscillate thereby moving the portion of the strip 54 in contact with the platen 46 in a fourth path that is entirely within the plane 50. During the 50 second time duration, the lead screw of the slide 62 in the workstation 36 is rotated to cause the fixture 64 to move toward the strip 54 of abrasive material at a second fixed rate that is predetermined by a geared arrangement. In this case the rate is considerably faster than the first predetermined rate of the lead screw of the first workstation 34. A faster rate is acceptable because the optical fibers have already been rough ground in the first workstation, and results in the benefit of a longer time of engagement of the tips of the optical fibers with the abrasive material, thereby assuring that the polishing operation is complete. Once the lead screw has been rotated to its stop position and the fixture is in its fully engaged position, as shown in FIG. 2, a slip clutch allows the motor 80 to continue driving the other motion functions of the machine 10 while the fixture remains stationary for the remainder of the 50 seconds. At the end of the 50 second time period the programmable controller 82 removes power from the forward windings of the motor 80 and applies power to the reverse windings thereby withdrawing the fixture 64 away from the strip of abrasive material. When the fixture 64 is fully withdrawn the programmable controller 82 removes all power from the motor 80 and reinitializes itself to be ready for another cycle of operation when the switch 84 is again actuated. The fixture 64 is then removed from the second 36 workstation and secured in the third workstation 38 with the first plane parallel with the plane 50 of the strip of abrasive material 56 and the process repeated a third time.

Figure 6:
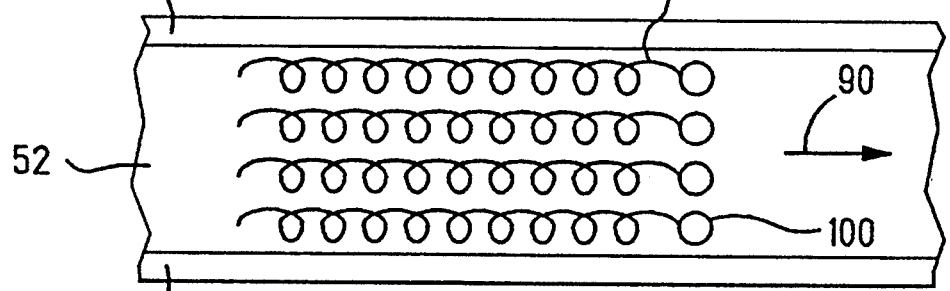
FIGS. 6 and 7 are partial plan views of the strip of abrasive material depicting the path traced by the tips of the optical fibers during polishing.
Figure 7:
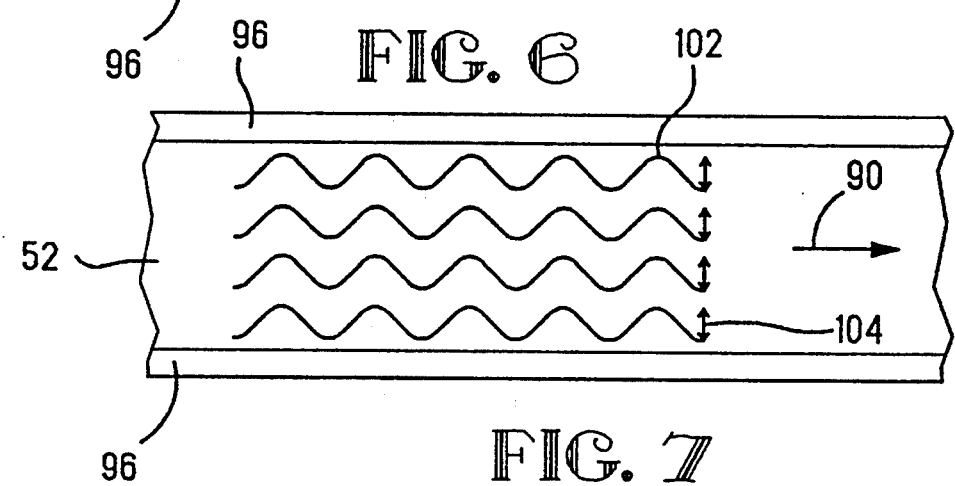

FIGS. 6 and 7 depict two of the many possible polishing patterns that are achievable by selecting various motions for the oscillating second path of the abrasive material. The strip 52 of abrasive material is shown moving along its first path as indicated by the arrow 90. The oscillating motion of the carriage causes the strip 52 to move laterally, back and forth as indicated by the phantom lines 96. When the oscillating motion is circular, as shown in FIG. 6, the combined second path is helical as shown at 98. If the strip 52 were not moving along the first path, then the combined motion would be a circle as depicted at 100. When the oscillating motion is linear, as shown in FIG. 7, the combined second path is zigzag as shown at 102. In this case, if the strip 52 were not moving along the first path, then the combined motion would be simply back and forth as depicted at 104. Note that the linear oscillating motion shown in FIG. 7 is substantially 90 degrees to the direction of the first path. It will be appreciated that other angles may be used to provide other advantageous or desirable patterns.

Additionally, it will be appreciated by those skilled in the art that once the first stage of grinding is complete and the fixture 64 has been moved to the second workstation, a second fixture 64 with cables to be ground and polished may be secured in the first workstation and ground concurrently with the operation of the second workstation. Similarly, when the second stage of grinding is complete the fixtures in the first and second workstations can be moved to the second and third workstations respectively and a third fixture having cables to be ground and polished can be secured in the first workstation and ground concurrently with the others.

An important advantage of the present invention is that the strip of abrasive material is moved, with respect to the tips of the ferrules, in both a circular path and a linear path so that the tips being polished are always moving over fresh abrasive material. There is no possibility that abrasive material, damaged or contaminated by the pinch rollers, could adversely affect the quality of the polishing operation. Additionally, the lead screw in the first workstation has a much slower rate of engagement than the others to assure that the optical fibers in this first stage of grinding will be ground down without being over stressed or damaged by the grinding process. This eliminates the need for initial hand preparation to remove fiber stubs.

We claim:

1. In an automated method for grinding and polishing the tips of terminated optical fibers of an optical cable having a ferrule for each optical fiber which is contained therein, the method utilizing an automated machine having a frame; first abrasive material having a flat surface defining a plane and a work area within said plane where said tips of said optical fibers engage said first abrasive material, wherein said machine includes a supply spindle containing said first abrasive material and a takeup spindle for collecting said first abrasive material after said grinding and polishing, carrier means attached to said frame for holding said abrasive material and moving it along a first path and a second path within said plane; a fixture for holding said fiber optic cables; and means for securing said fixture in said frame, comprising the steps of:

(a) loading said optical cable into said fixture;

(b) securing said fixture in a first station of said machine so that the ends of the ferrules are in a first plane substantially parallel with said plane of said first abrasive material;

(c) moving said first abrasive material along a first path within said work area including moving said first abrasive material from said supply spindle then through said work area then through said means for affecting said movement of said first abrasive material then to said takeup spindle;

(d) concurrently with step (c) moving said first abrasive material in an oscillating motion along a second path within said work area different from said first path;

(e) causing said fixture to move at a first predetermined rate toward said first abrasive material and into an engaged position wherein said tips of said optical fibers abrasively engage said flat surface thereof in said work area while maintaining said first plane parallel to said second plane of said first abrasive material; and (f) then causing said fixture to remain in said engaged position for a predetermined period of time.

2. The method according to claim 1 wherein said machine includes a second abrasive material having a flat surface defining a plane and a second work area within said plane where said tips of said optical fibers engage said second abrasive material, said carrier means arranged for holding said second abrasive material and moving it along a third path and a fourth path within its plane, the method including after step (f) the steps:

(g) then causing said fixture to move away from said first abrasive material;

(h) moving said fixture from said first station to a second station and securing said fixture so that said ends of said optical fibers are in a second plane substantially parallel with said plane of said second abrasive material;

(i) moving said second abrasive material along a third path within said second work area;

(j) concurrently with step (i) moving said second abrasive material in an oscillating motion along a fourth path within said second work area, different than said third path;

(k) causing said fixture to move at a second predetermined rate toward said second abrasive material and into an engaged position wherein said tips of said optical fibers abrasively engage said flat surface thereof in said second work area while maintaining said second plane parallel to said plane of said second abrasive material; wherein said machine includes supply spindles containing said first and second abrasive material and takeup spindles for collecting said first and second abrasive material after said grinding and polishing and wherein steps (c) and (i) include moving said first and second abrasive material from their respective supply spindles, then through their respective said first and second work areas, then through their respective said means for affecting said movement of said first and second abrasive material, then to their respective said takeup spindles.

3. The method according to claim 2 wherein said first predetermined rate of movement of said fixture towards said first abrasive material is different from said second predetermined rate of movement of said fixture toward said second abrasive material.

* * * * *